United States Patent
Matthews et al.

(10) Patent No.: US 7,403,718 B2
(45) Date of Patent: Jul. 22, 2008

(54) MODULATION PHASE SHIFT TO COMPENSATE FOR OPTICAL PASSBAND SHIFT

(75) Inventors: Manyalibo Joseph Matthews, Jersey City, NJ (US); Chunhui Xu, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1181 days.

(21) Appl. No.: 10/128,823

(22) Filed: Apr. 24, 2002

(65) Prior Publication Data

US 2004/0208649 A1     Oct. 21, 2004

(51) Int. Cl.
  *H04B 10/04* (2006.01)
(52) U.S. Cl. .................. 398/196; 398/188; 398/195
(58) Field of Classification Search ............ 398/82, 398/93, 95, 188, 195–196, 199; 372/32
  See application file for complete search history.

(56) References Cited

U.S. PATENT DOCUMENTS

| | | | |
|---|---|---|---|
| 5,805,321 A | * | 9/1998 | Ooi et al. ............... 398/98 |
| 6,239,897 B1 | * | 5/2001 | Jackson ................. 359/245 |
| 6,301,031 B2 | * | 10/2001 | Li ............................ 398/9 |
| 6,304,350 B1 | | 10/2001 | Doerr et al. ............. 359/130 |
| 7,006,769 B1 | * | 2/2006 | Kawasaki et al. ....... 398/158 |
| 2003/0175037 A1 | * | 9/2003 | Kimmitt et al. ......... 398/198 |
| 2004/0208635 A1 | * | 10/2004 | Sinsky .................... 398/183 |

* cited by examiner

*Primary Examiner*—Dzung D Tran

(57) ABSTRACT

Disclosed is a technique for compensating for optical passband shift of an optical component (for example an optical demultiplexer). A broadband source coupled to a dispersive element generates a chirped pulsed optical signal. Data is modulated onto particular wavelengths of the chirped pulsed optical signal by appropriately synchronizing a data modulator. The modulated signal is transmitted to the downstream optical demultiplexer, which may be subject to passband shift due to, for example, changes in environmental conditions. A feedback signal from an output port of the demultiplexer is provided to the transmitter and is used to phase shift the modulator. The phase shift results in effectively adjusting the wavelength onto which the data is modulated to substantially correspond to the passband centers of the demultiplexer.

12 Claims, 7 Drawing Sheets

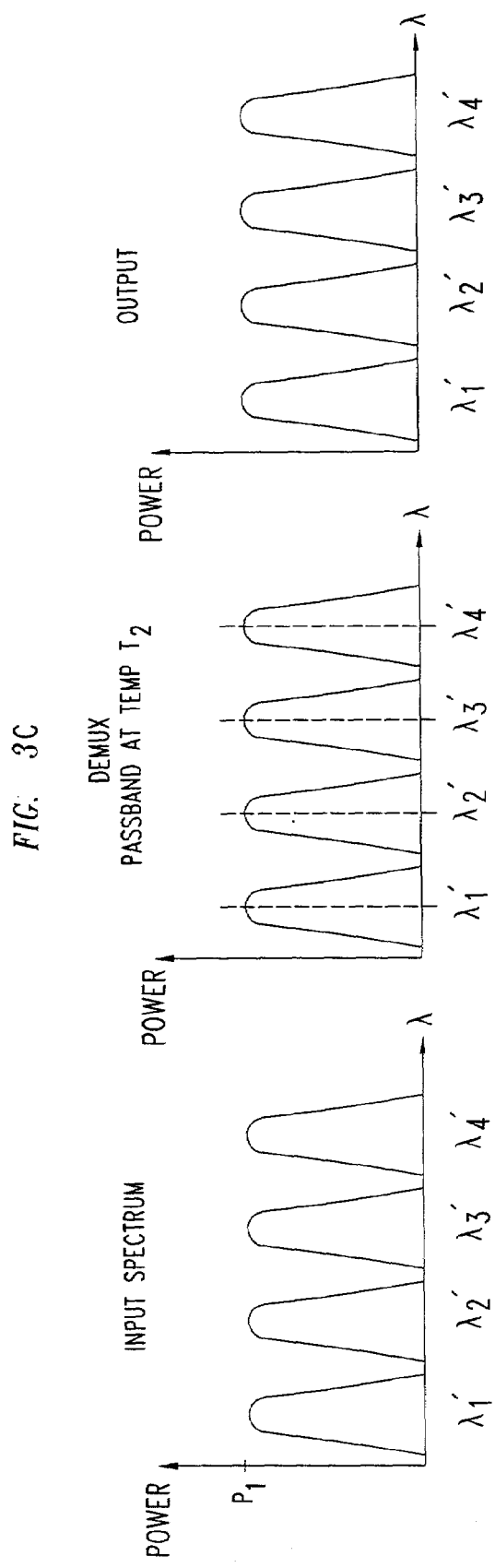

MODULATION PHASE SHIFT TO COMPENSATE FOR OPTICAL PASSBAND SHIFT

TECHNICAL FIELD

The invention relates generally to optical networking. More particularly, the invention relates to using a feedback mechanism to compensate for optical passband shift of a passive optical component.

BACKGROUND OF THE INVENTION

Optical networks use light to transmit information between points of the network. In a passive optical network (PON) the transmission facility between the transmitter and the receivers consists of passive (i.e., un-powered) optical components. Thus, once an optical signal leaves the transmission facility, the optical signals are routed to their destination via passive components, relying on the inherent properties of such components to ensure appropriate signal routing.

One type of optical network which is becoming increasingly popular is the wavelength division multiplexed (WDM) network, which multiplexes multiple wavelengths of light on a single fiber for transmission through the network. Such systems provide for high bandwidth transmission between the transmission facility and receivers. At the transmitter, various wavelengths are generated and they are multiplexed onto a single fiber. The fiber then leaves the transmission facility and the multiplexed signal travels along the outside transmission facilities toward the customer premises (generally an optical network unit (ONU)). Prior to entering the ONU, the multiplexed optical signal must be demultiplexed, such that each ONU receives the appropriate wavelength associated with the particular ONU.

The multiplexed signals are demultiplexed using an optical demultiplexer which is designed to receive the multiple wavelengths at one input port, and demultiplex the wavelengths such that a particular wavelength exits at each of a plurality of output ports of the demultiplexer. More particularly, the demultiplexer will have certain passband characteristics such that particular wavelengths will be output on each of the output ports. Preferably, each output passband will be centered upon the desired wavelength to be output on the associated port. Thus, for example, a demultiplexer which receives on its input port a broadband signal containing wavelengths $\lambda_1, \lambda_2, \lambda_3, \lambda_4$ will output $\lambda_1$ on output port 1, $\lambda_2$ on output port 2, $\lambda_3$ on output port 3, and $\lambda_4$ on output port 4. As such, the WDM demultiplexer should have the characteristic that the passband of output port 1 is centered on $\lambda_1$, the passband of output port 2 is centered on $\lambda_2$, the passband of output port 3 is centered on $\lambda_3$, and the passband of output port 4 is centered on $\lambda_4$.

Passive optical network components in the transmission network, such as WDM demultiplexers, are often located in the outside transmission facility and as such, are subject to environmental conditions. In particular, the temperature of the WDM demultiplexers will vary with changes in the ambient outside temperature. A problem arises in that it is a characteristic of such devices that their passband characteristics change with a change in temperature of the component. Thus, as the outside temperature changes, the passbands of the component will shift such that the passbands of the output ports will not be centered on the appropriate wavelengths.

As a result of the aforementioned passband shifts, the power of the signal routed to the customer premise ONU's will be lowered, depending on the severity of the passband shift. Various techniques are known for addressing this problem. One such technique requires that the temperature of the WDM demultiplexer in the outside transmission facility be temperature controlled to maintain the component at an appropriate operating temperature. This is a less than desirable technique because it requires active monitoring and temperature control in the outside transmission facility. Another technique for addressing this problem is to adjust the wavelengths generated by the transmitter to compensate for the passband shift of the demultiplexer in the field. This is also a less than desirable technique in typical WDM systems because many lasers must be adjusted together making a uniform shift difficult to maintain. Furthermore, since laser wavelengths are typically adjusted by varying the laser's temperature, the output power of each laser source will be adversely affected. Another technique for addressing this problem is to use a thermal (i.e., temperature insensitive) devices in the outside transmission facility. However, these devices tend to be very complex and expensive.

SUMMARY OF THE INVENTION

The invention provides a novel technique for dynamically adjusting an optical network to compensate for passband shift of an optical component. In an optical network which modulates data onto a chirped pulsed optical signal, the present invention dynamically adjusts for passband shift of a downstream optical component by adjusting the phase of the modulator. In an advantageous embodiment, the downstream optical component is a demultiplexer and the phase of the modulator is adjusted such that the data is modulated onto wavelengths substantially corresponding to the centers of the optical demultiplexer passbands.

In one embodiment of the invention, an optical transmitter generates a chirped pulsed optical signal. As described in further detail below, a chirped pulsed optical signal is a signal in which each of a plurality of component wavelengths has peak power during its own time interval. Such a signal may result, for example, when a broadband pulsed optical signal is dispersed. Data is then modulated onto each of the component wavelengths for downstream transmission to an optical demultiplexer. Since the wavelengths of the chirped optical signal are dispersed in time, the modulator is synchronized such that appropriate data is modulated onto appropriate ones of the wavelengths during different time intervals. The downstream optical demultiplexer suffers from the passband shift problem described above. In accordance with the invention, the phase of the modulator is adjusted such that it modulates data onto wavelengths which substantially correspond to the new passband centers of the optical demultiplexer. Such dynamic adjustment of the phase of the modulator provides for improved signal power when the data reaches an end user.

In accordance with one embodiment of the invention, the optical network is configured such that a feedback signal from the optical demultiplexer is transmitted back to the transmitter. The feedback signal is used in order to determine whether a phase shift of the modulator is required. In one embodiment, the feedback signal is the signal from one of the output ports of the optical demultiplexer. This signal is received at an analog receiver at the transmitter and if the power of the signal is below a threshold, then the phase of the modulator is adjusted in order to increase the power of the received signal.

The modulator phase shift in accordance with the invention provides for effective compensation for passband shift at the optical demultiplexer. The dynamic compensation provided by the present invention is fast as compared to the expected passband shifts at the optical demultiplexer, and as such the invention provides an effective technique for compensating for such passband shifts.

These and other advantages of the invention will be apparent to those of ordinary skill in the art by reference to the following detailed description and the accompanying drawings.

BRIEF DESCRIPTION OF THE DRAWINGS

FIG. 3C illustrates the input spectrum of an optical signal entering an optical demultiplexer, the passband of the demultiplexer at a temperature of $T_2$, and the resulting output signal of the demultiplexer, after modulator phase adjustment in accordance with the principles of the invention;

DETAILED DESCRIPTION

Figure 1:
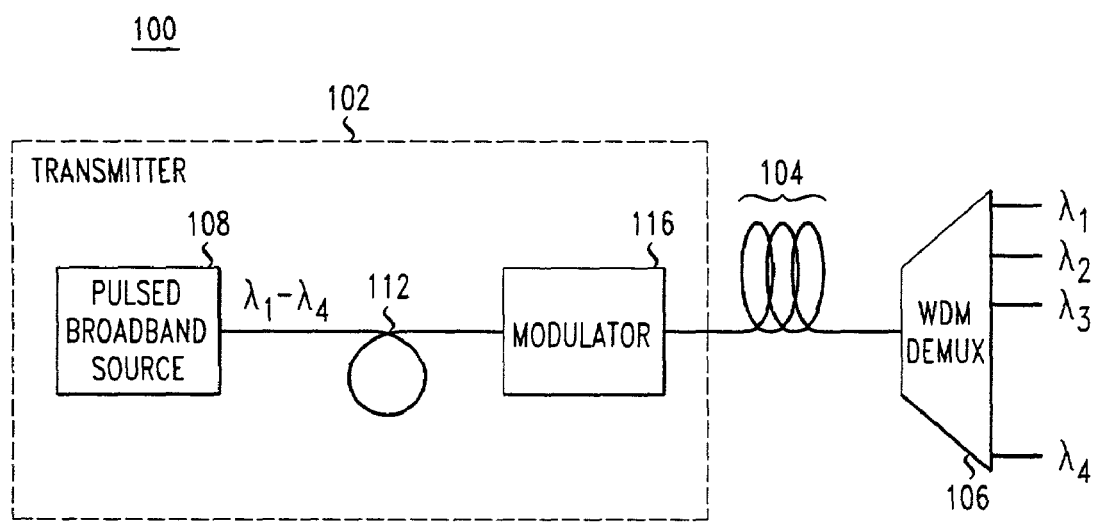
FIG. 1 shows an optical network in accordance with the prior art.

FIG. 1 shows an optical network 100 in accordance with the prior art, an understanding of which will assist in a description of the present invention. Network 100 includes a transmitter 102 which transmits a downstream chirped pulse optical signal to receivers (for example, ONU's at customer premises). The signal is comprised of 4 wavelengths $\lambda_1$, $\lambda_2$, $\lambda_3$, $\lambda_4$ and it travels via optical fiber 104 to a WDM demultiplexer 106 for distribution to the end users (not shown). It is noted that for purposes of the foregoing description, a WDM network utilizing four wavelengths will be described. However, one skilled in the art of optical networking would readily be able to implement the present invention using any number of wavelengths.

Figure 2A:
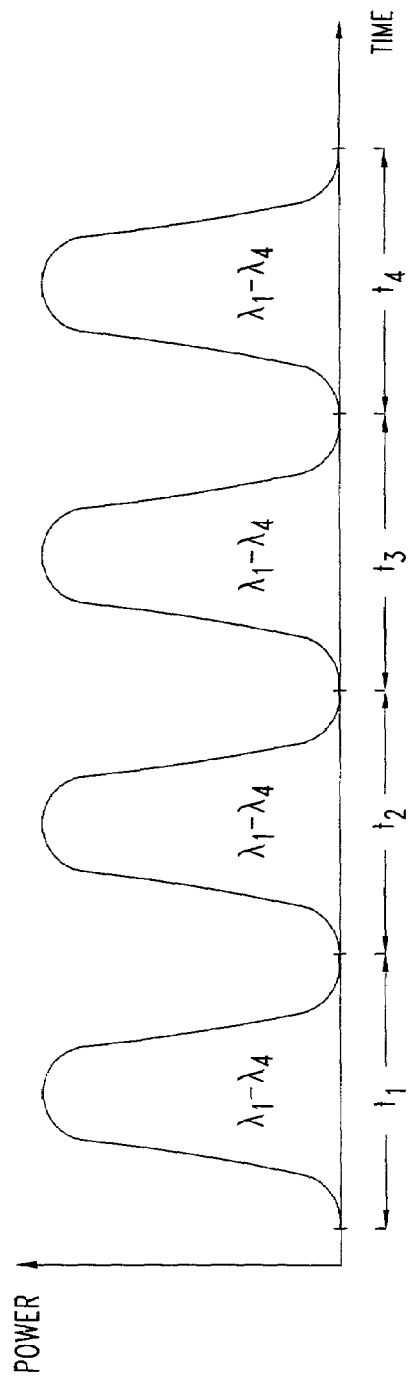
FIG. 2A illustrates characteristics of broadband light pulses generated by a pulsed broadband source.
Figure 2B:
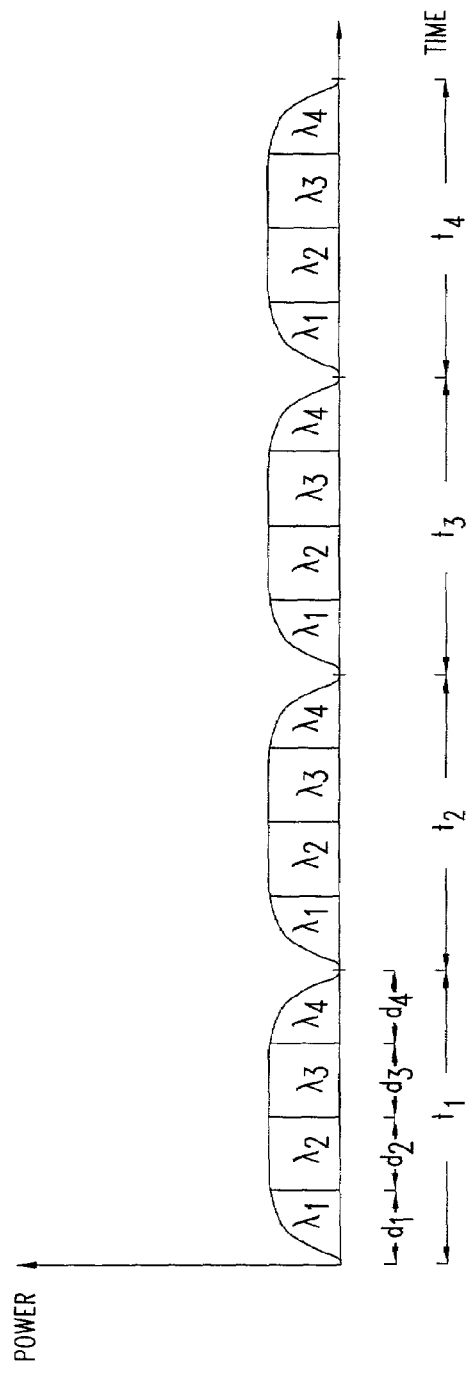
FIG. 2B illustrates the characteristics of a chirped pulsed optical signal.

The functioning of the chirped pulsed optical transmitter and network of FIG. 1 will be described in further detail in conjunction with FIGS. 2A and 2B. Pulsed broadband source 108 generates broadband light pulses as illustrated in FIG. 2A. Each pulse lasts for a certain time duration (t) and the generated pulse is made up of a broadband light spectrum. In the illustration, each pulse includes wavelengths $\lambda_1$, $\lambda_2$, $\lambda_3$, $\lambda_4$. It is to be understood that FIG. 2A is only meant as a general illustration of the output of pulsed broadband source 108. One skilled in the art will recognize that in actuality the pulses shown in FIG. 2A would be much narrower than shown relative to the pulse spacing. The light pulses travel through standard single mode fiber 112 which disperses the light by delaying the transmission of each wavelength by a different amount. Fiber dispersion is well known in the art, the details of which will not be discussed in detail herein. As a result of passing through the optical fiber 112, the optical pulses are spread in time as illustrated in FIG. 2B. Such pulses are called chirped pulses and a signal transmitting such pulses is referred to herein as a chirped pulsed optical signal. Each of the broadband pulses has been dispersed such that in the chirped pulsed optical signal each of the component wavelengths now has peak power during its own time interval (which is smaller than the time interval of the broadband pulse). Thus, for example, the broadband pulse during time $t_1$ (FIG. 2A) is dispersed by the optical fiber 112 to result in the transmission of individual wavelengths $\lambda_1$, $\lambda_2$, $\lambda_3$, $\lambda_4$ during time $t_1$ (FIG. 2B). It is to be understood that although FIG. 2B shows discrete wavelengths, in actuality a continuum of wavelengths are spread over the time interval $t_1$. One skilled in the art would readily understand that FIG. 2B is merely used to illustrate the principles of the present invention.

Once each of the component wavelengths has been dispersed, the modulator 116 modulates a data signal onto individual wavelengths during an appropriate time interval. Thus, as shown in FIG. 2B, the modulator is synchronized so that during timer interval $t_1$ it modulates data onto wavelength $\lambda_1$ during time interval $d_1$, wavelength $\lambda_2$ during time interval $d_2$, wavelength $\lambda_3$ during time interval $d_3$, and wavelength $\lambda_4$ during time interval $d_4$. The resulting optical signal, onto which the data has been modulated, travels via optical fiber 104 to an input port of WDM demultiplexer 106. The WDM demultiplexer 106 demultiplexes the signal into its component wavelengths $\lambda_1$, $\lambda_2$, $\lambda_3$, $\lambda_4$ and outputs each on an appropriate output port. As would be understood by one skilled in the art, the data modulated onto wavelength $\lambda_n$ is the data that is intended for downstream delivery to the appropriate user associated with wavelength $\lambda_n$.

As described above in the background, one of the problems with a WDM-PON of the type shown in FIG. 1, is that the WDM demultiplexer 106 is part of the outside transmission facility and is therefore exposed to temperature fluctuations. One of the know problems with WDM demultiplexers is that they are subject to passband shift with variations in temperature. This problem will be further described in conjunction with FIGS. 3A and 3B.

Figure 3A:
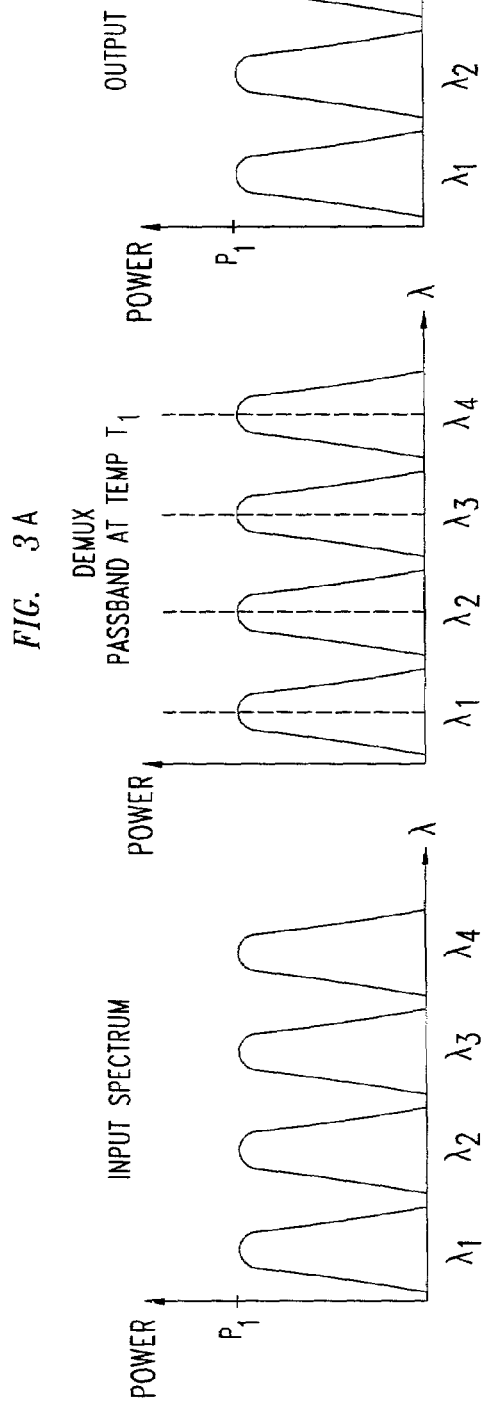
FIG. 3A illustrates the input spectrum of an optical signal entering an optical demultiplexer, the passband of the demultiplexer at a temperature of $T_1$, and the resulting output signal of the demultiplexer.

FIG. 3A shows the input spectrum of the optical signal entering WDM demultiplexer 106 from fiber 104. As can be seen, each of the component wavelengths upon which data has been modulated has a relatively high power shown as pi. FIG. 3A also shows the passband of the WDM demultiplexer 106 at a temperature of $T_1$. At temperature of $T_1$ (which is assumed to be the intended operating temperature of the demultiplexer) the passbands of the WDM demultiplexer are centered at wavelengths $\lambda_1$, $\lambda_2$, $\lambda_3$, $\lambda_4$ (indicated by vertical broken lines). As such, the output of the WDM demultiplexer 106 at the wavelengths upon which data has been modulated is shown to be at a relatively high power level $p_1$.

Figure 3B:
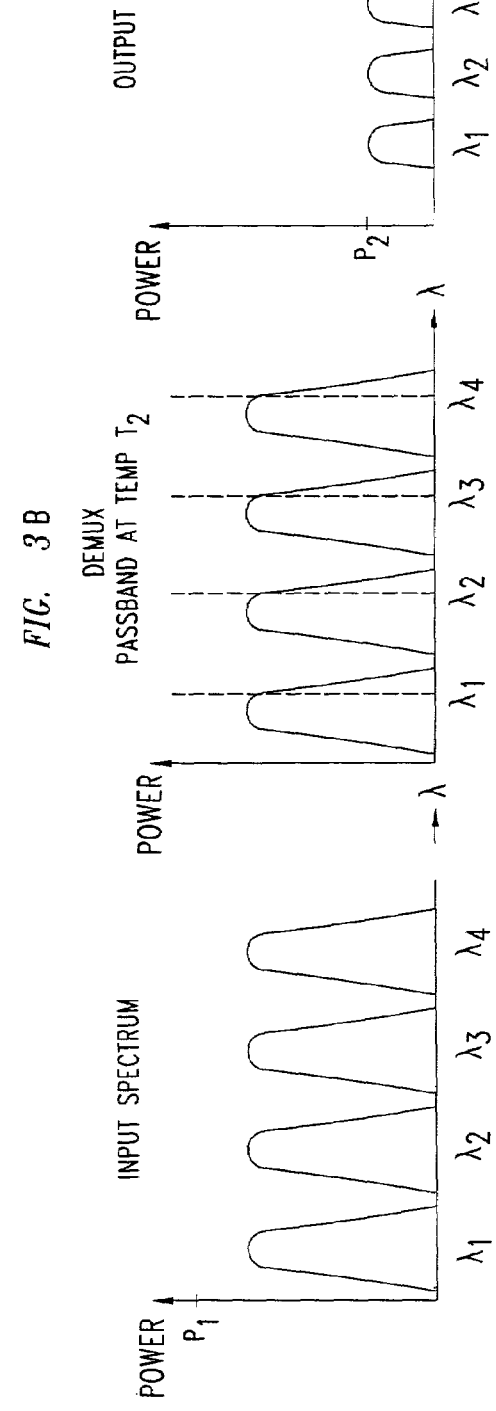
FIG. 3B illustrates the input spectrum of an optical signal entering an optical demultiplexer, the passband of the demultiplexer at a temperature of $T_2$, and the resulting output signal of the demultiplexer.

FIG. 3B also shows the input spectrum of the optical signal entering WDM demultiplexer 106 from fiber 104. Again, each of the component wavelengths upon which data has been modulated has a relatively high power shown as $p_1$. However, FIG. 3B now shows the passband of the WDM demultiplexer 106 at a temperature of $T_2$. At temperature of $T_2$ (which is not the intended operating temperature of the demultiplexer) the passbands of the WDM demultiplexer are not centered at wavelengths $\lambda_1$, $\lambda_2$, $\lambda_3$, $\lambda_4$ (indicated by vertical broken lines). Instead, the passbands are centered at wavelengths $\lambda_1'$, $\lambda_2'$, $\lambda_3'$, $\lambda_4'$. As such, the output of the WDM demultiplexer 106 at the wavelengths upon which data has been modulated is shown to be at a relatively low power level $p_2$. Furthermore, significant cross talk occurs between neighboring WDM channels.

The result of the passband shift described above in connection with FIGS. 3A and 3B is that at temperature $T_1$, the data modulated onto a particular wavelength will be received at a sufficient power level by the end users receiving the signal via an output port of the WDM demultiplexer 106. However, at a temperature of $T_2$, the data modulated onto a particular wavelength will be received at an insufficient power level by the end users receiving the signal via an output port of the WDM demultiplexer 106. As a result of this insufficient power level and channel cross talk, the received data may have an unacceptable error rate.

The present invention solves the above described passband shift problem by dynamically adjusting the phase of the modulator such that data is modulated onto wavelengths corresponding to the centers of the WDM demultiplexer passbands. Thus, rather than adjusting the temperature of the WDM demultiplexer to compensate for passband shift (which would require the use of powered components in the outside transmission facility) the modulation phase is adjusted to compensate for the passband shift.

Figure 4:
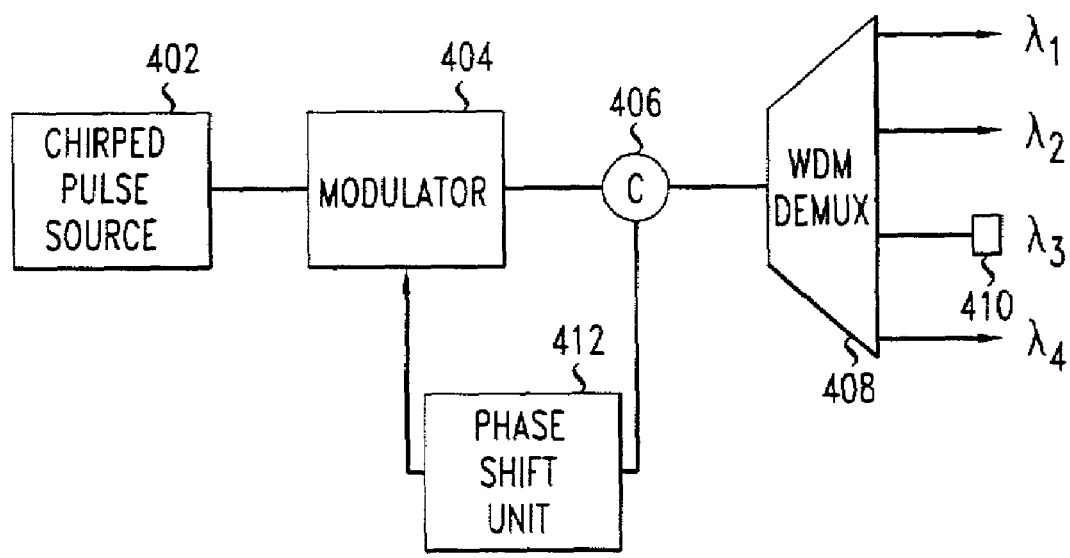
FIG. 4 shows a high level block diagram of a system incorporating the principles of the present invention.

FIG. 4 shows a high level block diagram of a system incorporating the principles of the present invention. The system includes a chirped pulse source 402, which may be implemented, for example, as a pulsed broadband source 108 and dispersive optical fiber 112 as described above in conjunction with FIG. 1. The chirped pulsed optical signal is provided to a modulator 404 which modulates data signals onto the appropriate wavelengths as described above in conjunction with modulator 116. The modulated signal is provided to a WDM demultiplexer 408 via a circulator 406 which allows downstream signals to be transmitted from the modulator 404 to the WDM demultiplexer 408 and also allows upstream signals received from the WDM demultiplexer 408 to pass to a phase shift unit 412. In accordance with one embodiment of the invention, one of the signals from one of the output ports of the WDM demultiplexer 408 (in this example $\lambda_3$) is used as a feedback signal. It is noted that higher or lower order passbands can also be used so that the feedback port can still be used for data transmission. A mirror 410 reflects the signal on the output port associated with $\lambda_3$ back through the WDM demultiplexer 408, through circulator 406 to the phase shift unit 412. As will be described in further detail below, w the phase shift unit 412 adjusts the phase of the modulator 404 so that the data signals are modulated onto wavelengths corresponding to the passband centers of the WDM demultiplexer 408. The phase shift unit 412 monitors the feedback signal and dynamically adjusts the phase of the modulator 404 based on the operating characteristics of the WDM demultiplexer 408 which is experiencing passband shift as a result of temperature fluctuations in the outside transmission facility.

Figure 5:
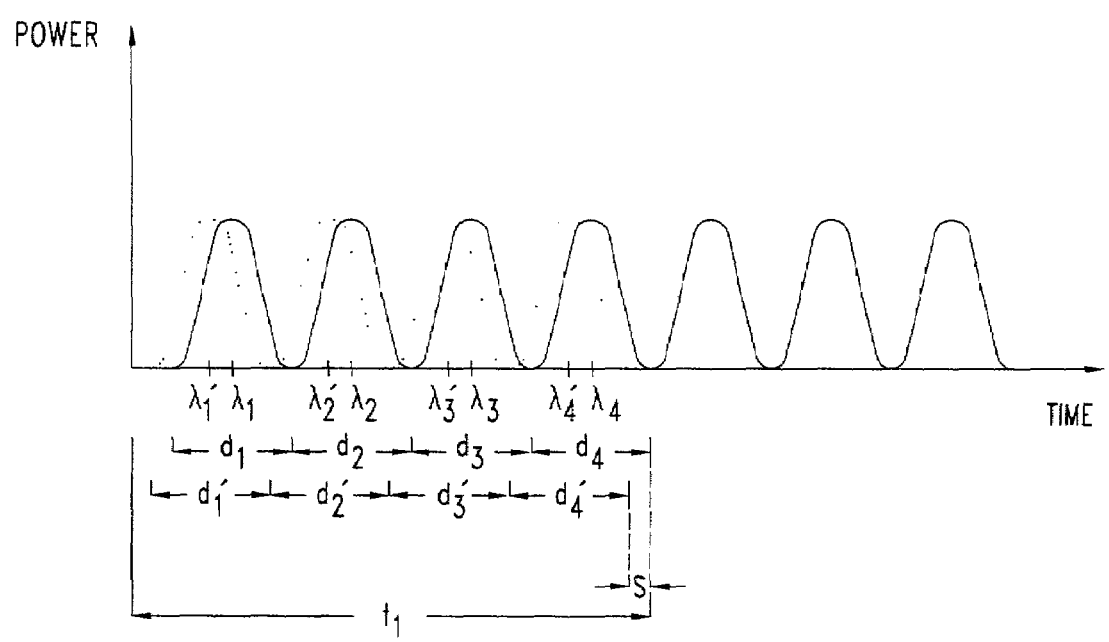
FIG. 5 illustrates the modulator phase shift in accordance with the principles of the invention.

The phase shift of the modulator 404 is further described in conjunction with FIG. 5. As described above in conjunction with FIG. 2B, the modulator 404 is originally synchronized so that it modulates data onto wavelength $\lambda_1$ during time interval $d_1$, wavelength $\lambda_2$ during time interval $d_2$, wavelength $\lambda_3$ during time interval $d_3$, and wavelength $\lambda_4$ during time interval $d_4$. These modulation intervals are shown in FIG. 5. However, now assume that the passbands of WDM demultiplexer 408 have shifted as shown in FIG. 3B such that the passband are now centered at $\lambda_1'$, $\lambda_2'$, $\lambda_3'$, $\lambda_4'$. In accordance with the invention, the modulator 404 is phase shifted under control of the phase shift unit 412 such that the data is modulated during time intervals $d_1'$, $d_2'$, $d_3'$, $d_4'$ corresponding to new wavelengths $\lambda_1'$, $\lambda_2'$, $\lambda_3'$, $\lambda_4'$. Thus, the phase has been shifted by a time of $s_1$ as shown in FIG. 5. The result is that the data for each of the downstream receivers has been modulated on a wavelength which coincides with the center of a passband of the WDM demultiplexer 408. As such, the data will be received with higher power, lower cross talk, and with a lower error rate.

The phase adjustment described in conjunction with FIG. 5 is further illustrated in FIG. 3C. As compared with FIG. 3B, the input spectrum has now been shifted to coincide with the passband centers of the WDM demultiplexer 408 at temperature $T_2$. As such, the output of the optical signals upon which the data has been modulated is at a relatively high power level $p_1$, which will result in an acceptable data rate. Thus, by phase shifting the modulator, the present invention compensates for passband shift of the WDM demultiplexer.

Further details of one embodiment of the invention will now be described in conjunction with FIG. 6 which shows an optical network 600 configured in accordance with the principles of the present invention. The optical transmitter 602 transmits optical signals to a WDM demultiplexer 604 for demultiplexing and distribution to end users (not shown). The transmitter 602 comprises a broadband source 606 for generating a broadband optical signal. The broadband source 606 may be, for example, a superluminescent light emitting diode (LED) which generates an optical signal having a wavelength spectrum of approximately 1535-1570 nanometers. The transmitter 602 also contains a gain switch driver 608 which drives the broadband source 602 to generate optical signal pulses at approximately 100 MHZ. Continuing the example of the four wavelength WDM system, the output of the broadband source 606 is as described in conjunction with FIG. 2A above.

The output of the broadband source 606 is provided to a dispersive element 610 which spreads out in time the individual component wavelengths of the broadband optical signal. Dispersive elements are well known in the art and operate on the principle that different wavelengths incur different time delays as they pass through the dispersive element. Well known dispersive elements include, for example, single mode fiber, dispersion compensation fiber, and chirped fiber bragg gratings. The output of the dispersive element 610 is as described above in conjunction with FIG. 2B.

Figure 6:
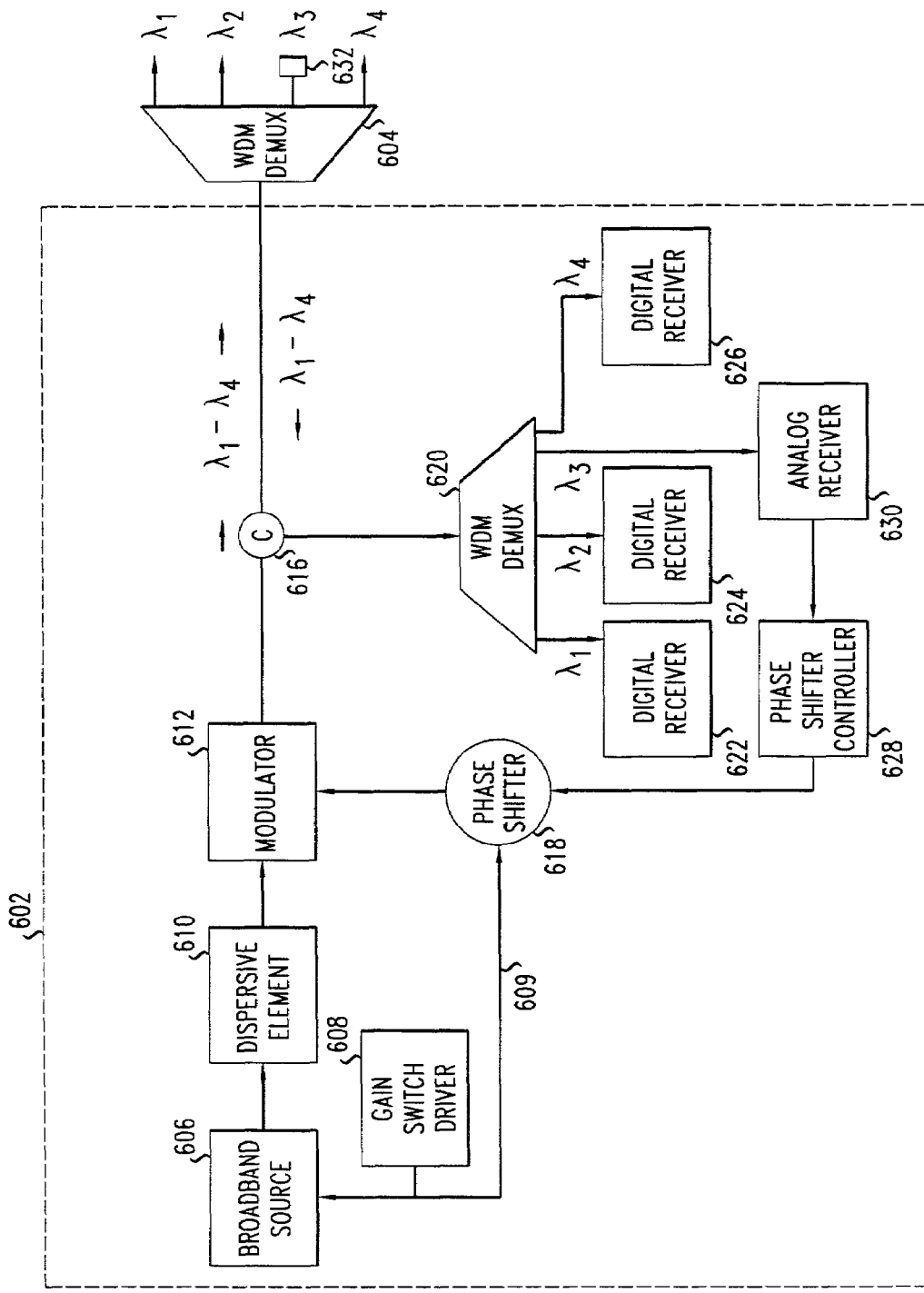
FIG. 6 shows a high level block diagram of an optical network configured in accordance with the principles of the present invention.

It is noted that in choosing appropriate components for a system of the type shown in FIG. 6, the broadband source 606, gain switch driver 608, and dispersive element 610 must be chosen such that the optical signal pulses output from the broadband source have sufficient spacing such that the wavelengths will not interfere with each other after they are dispersed by the dispersive element 610. Generally, the initial pulse width provided by the broadband source should be a small fraction of the bit-period of the modulator. For example, and without limitation, a particular embodiment may be implemented such that 200 ps (wide) pulses emerge from a ~40 nm broadband source and are further narrowed through pulse carving to roughly 40 ps. At 52 MHz these pulses repeat every 19 ns and can be chirped through 15 km of single mode fiber having a dispersion of D=17 ps/nm.km. The resulting chirped pulses provide reasonable eye patterns when modulated at 10 GHz, with 1.6 nm spectral guard bands. One skilled in the art would readily be able to design and implement other acceptable embodiments.

The output of the dispersive element 610 is provided to a modulator 612. The modulator 612 is a high rate (e.g., 5 Gbps/10 Gbps) modulator which will modulate data onto each of the component wavelengths as described above in conjunction with FIG. 2B. The data may be received from a variety of sources and the management of downstream data onto a plurality of downstream signals is well known in the art of data networking, the details of which are not necessary for an understanding of the present invention.

As described above in conjunction with FIG. 2B, the modulator must be synchronized (prior to any phase adjustment in accordance with the invention) with the optical signal being received from the broadband source 606 and the dispersive element 610. That is, the data to be sent to the end user associated with $\lambda_1$ must be modulated onto the optical signal at the correct time. As such, the output of the gain switch driver 608 is also provided to the modulator 612 through the phase shifter 618 and synchronizes the downstream data to the nth order harmonic of the gain switch driver 608 output signal, with in one embodiment n being the number of WDM channels.

The modulated optical signal is output from the modulator 612 to the circulator 616 and then to the outside transmission facility of the optical network. Upon the signals reaching the WDM demultiplexer 604, the signal is demultiplexed and the component wavelengths $\lambda_1$, $\lambda_2$, $\lambda_3$, $\lambda_4$ are output on individual output ports of the WDM demultiplexer 604 as shown in FIG. 6. In accordance with the invention, a feedback signal is used to adjust the phase of the modulator 612. In the particular embodiment shown in FIG. 6, the feedback signal is implemented as follows. A mirror 632 is used to redirect one of the wavelengths (in this example $\lambda_3$) output from the WDM demultiplexer 604 back to the transmitter 602. The feedback signal travels back through the circulator 616 along with any other upstream signals from users on the other wavelengths (in this example wavelengths $\lambda_1$, $\lambda_2$, $\lambda_4$).

The circulator 616 directs the upstream signals to WDM demultiplexer 620 which separates out the component wavelengths on its output ports as shown in FIG. 6. Wavelengths $\lambda_1$, $\lambda_2$, $\lambda_4$ are upstream data signals and as such they are directed to digital receivers 622, 624, 626 for decoding in accordance with well known data networking techniques. A description of decoding of upstream data signals is not required for an understanding of the present invention and such a description is not provided herein. The feedback signal ($\lambda_3$) is provided to an analog receiver 630 which in turn provides its output to phase shift controller 628. The phase shift controller 628 constantly measures the voltage across the analog receiver 630. For some voltage error margin the phase shift controller 628 will apply a voltage to the phase shifter 618 so as to shift the phase in an arbitrary direction. This will cause the wavelength $\lambda_3$ to shift relative to the WDM demultiplexer 604 passband. The phase shift controller 628 then monitors the change in voltage of the analog receiver 630 to determine if the shift was in the correct direction (i.e., if the voltage at the analog receiver 630 increases). If the shift was in the correct direction, then the phase shift controller 628 continues to apply a voltage to the phase shifter 618 to continue to shift the phase in the particular direction until the voltage across the analog receiver 610 is within the voltage error margin. If the shift was not in the correct direction (i.e., the voltage at the analog receiver 630 decreases), then the phase shift controller 628 applies a voltage to the phase shifter 618 to shift the phase in the opposite direction and continues to apply a voltage to the phase shifter in such direction until the voltage across the analog receiver 610 is within the voltage error margin. Since the phase shift and the corresponding wavelength shift are very fast (~1 ns) as compared to the expected passband shifts due to temperatures for the same wavelength range (1-1000s), the phase shift is practically instantaneous.

Thus, by adjusting the phase of the modulator as described above, the system compensates for passband shift of the WDM demultiplexer in the outside transmission facility.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method of operation of an optical network comprising the steps of:
    generating a chirped pulsed optical signal;
    modulating data onto said chirped pulsed optical signal using a modulator;
    transmitting said modulated chirped pulsed optical signal to an optical demultiplexer;
    receiving a feedback signal from said optical demultiplexer; and
    phase shifting the modulator based on said feedback signal;
    wherein said step of phase shifting further comprises the step of phase shifting said modulator such that data is modulated onto wavelengths of said chirped pulsed optical signal which substantially correspond to passband centers of said optical demultiplexer.

2. The method of claim 1 wherein said step of phase shifting further comprises the steps of:
    providing said feedback signal to an analog receiver; and
    measuring the voltage across said analog receiver.

3. An optical network comprising:
    a chirped pulse source for generating a chirped pulsed optical signal;
    a modulator for modulating data onto said chirped pulsed optical signal; and
    a phase shift unit responsive to a feedback signal received from an optical demultiplexer for adjusting the phase of the modulator;
    wherein said phase shift unit is adapted to adjust the phase of the modulator to compensate for passband shift of said optical demultiplexer.

4. The optical network of claim 3 wherein said chirped pulse source further comprises:
    a broadband optical source; and
    a dispersive element.

5. The optical network of claim 4 wherein said dispersive element is single mode fiber.

6. The optical network of claim 4 wherein said dispersive element is dispersion compensation fiber.

7. The optical network of claim 4 wherein said dispersive element is chirped fiber bragg grating.

8. A method of operation of an optical network comprising the steps of:
    generating a chirped pulsed optical signal;
    modulating data onto said chirped pulsed optical signal using a modulator;
    transmitting said modulated signal to an optical demultiplexer; and
    adjusting the phase of said modulator based on a feedback signal received from said optical demultiplexer to compensate for passband shift of said optical demultiplexer;

wherein the phase of said modulator is adjusted such that data is modulated onto wavelengths substantially corresponding to the centers of the optical demultiplexer passbands.

9. The method of claim 8 wherein said feedback signal comprises a signal from one output port of said optical demultiplexer.

10. An optical network comprising:
   means for generating a chirped pulsed optical signal;
   modulating means for modulating data onto said chirped pulsed optical signal; and
   phase shifting means responsive to a feedback signal received from an optical demultiplexer for adjusting the phase of the modulating means;
wherein said phase shifting means is adapted to adjust the phase of the modulating means to compensate for passband shift of said optical demultiplexer.

11. The optical network of claim 10 wherein said feedback signal comprises the optical signal from an output port of said optical demultiplexer.

12. The optical network of claim 10 further comprising:
   an analog receiver; and
   means for measuring the voltage across said analog receiver.

* * * * *